US012359982B2

(12) United States Patent
Yamasaki et al.

(10) Patent No.: US 12,359,982 B2
(45) Date of Patent: Jul. 15, 2025

(54) MOUNTING TABLE, INSPECTION DEVICE, AND TEMPERATURE CALIBRATION METHOD

(71) Applicant: TOKYO ELECTRON LIMITED, Tokyo (JP)

(72) Inventors: Yoshihito Yamasaki, Singapore (SG); Jun Mochizuki, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 677 days.

(21) Appl. No.: 17/616,101

(22) PCT Filed: May 23, 2020

(86) PCT No.: PCT/JP2020/020432
§ 371 (c)(1),
(2) Date: Dec. 2, 2021

(87) PCT Pub. No.: WO2020/246279
PCT Pub. Date: Dec. 10, 2020

(65) Prior Publication Data
US 2022/0316953 A1 Oct. 6, 2022

(30) Foreign Application Priority Data
Jun. 5, 2019 (JP) ................................ 2019-105507

(51) Int. Cl.
G01K 1/14 (2021.01)
G01K 15/00 (2006.01)
(52) U.S. Cl.
CPC ............. G01K 1/14 (2013.01); G01K 15/005 (2013.01)

(58) Field of Classification Search
CPC ........ G01K 1/14; G01K 15/005; G01K 1/026; G01K 1/02; H01L 22/12
See application file for complete search history.

(56) References Cited

U.S. PATENT DOCUMENTS

2019/0301017 A1* 10/2019 Tian ........................ C23C 16/46
2020/0080894 A1* 3/2020 Leow ................. H01L 21/67115
2021/0033666 A1* 2/2021 Kasai ................. G01R 31/2863

FOREIGN PATENT DOCUMENTS

| JP | 2006-53075 A | | 2/2006 |
| JP | 2006053075 A | * | 2/2006 |
| JP | 2012-231040 A | | 11/2012 |
| JP | 2013104667 A | * | 5/2013 |
| JP | 2016181601 A | * | 10/2016 |
| JP | 2017-198523 A | | 11/2017 |

(Continued)

OTHER PUBLICATIONS

JP2006053075A (Year: 2006).*

(Continued)

Primary Examiner — John E Breene
Assistant Examiner — Janice M Soto
(74) Attorney, Agent, or Firm — Fenwick & West LLP

(57) ABSTRACT

There is provided a mounting table on which a substrate to be inspected is mounted. The mounting table comprises: a plurality of temperature sensors, each configured to measure a temperature of a corresponding one of a plurality of spots on the mounting table; and electrode pads, each connected to a corresponding one of the temperature sensors and installed on a mounting surface.

4 Claims, 6 Drawing Sheets

(56) References Cited

FOREIGN PATENT DOCUMENTS

| JP | 2019-21845 A | | 2/2019 |
|----|--------------|---|--------|
| JP | 2020-106454 A | | 7/2020 |
| KR | 20180002373 A | * | 1/2018 |

OTHER PUBLICATIONS

JP2013104667A (Year: 2013).*
JP2016181601A (Year: 2016).*
PCT International Search Report and Written Opinion, PCT Application No. PCT/JP2020/020432, Jul. 28, 2020, 12 pages (with English Translation of International Search Report).

* cited by examiner

MOUNTING TABLE, INSPECTION DEVICE, AND TEMPERATURE CALIBRATION METHOD

TECHNICAL FIELD

The present disclosure relates to a mounting table, an inspection device, and a temperature calibration method.

BACKGROUND

A prober is an example of an inspection device for inspecting a wafer on which a plurality of semiconductor devices are formed. The prober includes a probe card having contact probes which are a plurality of columnar contact terminals. In the prober, each of the contact probes is brought into contact with a corresponding one of electrode pads or solder bumps in a semiconductor device by bringing the wafer into contact with the probe card. In the prober, a conduction state of an electric circuit and the like is inspected by causing electricity to flow from each of the contact probes to the electric circuit of the semiconductor device connected to each of the electrode pads or each of the solder bumps.

PRIOR ART DOCUMENTS

Patent Documents

Patent Document 1: Japanese Patent Application Publication No. 2012-231040

SUMMARY

Problems to Be Resolved by the Invention

The present disclosure provides a mounting table, an inspection device, and a temperature calibration method capable of easily calibrating a control temperature sensor of the mounting table in a vacuum-suction state.

Means for Solving the Problem

A mounting table according to one aspect of the present disclosure is a mounting table on which a substrate to be inspected is mounted, and includes a plurality of temperature sensors and electrode pads. Each of the plurality of temperature sensors measures a temperature of a corresponding one of a plurality of spots on the mounting table. Each of the electrode pads is connected to a corresponding one of the temperature sensors and installed on a mounting surface.

Effect of the Invention

According to the present disclosure, a control temperature sensor of a mounting table can be easily calibrated in a vacuum-suction state.

Objects, configurations, and effects other than those described above will become apparent from the following description of embodiments.

DETAILED DESCRIPTION

Hereinafter, embodiments of a mounting table, an inspection device, and a temperature calibration method to be disclosed will be described in detail with reference to the drawings. The disclosed technology is not limited by the following embodiments.

In recent years, a wafer inspection device in which a plurality of probe cards are provided and a semiconductor device of a wafer can be inspected by using one probe card while a wafer is transported to another probe card by means of a transport stage has been developed to improve wafer inspection efficiency. In this wafer inspection device, when each of the wafers is brought into contact with each of the probe cards, the wafer is mounted on a chuck top which is a thick plate member, and a space between the probe card and the chuck top is vacuum-suctioned so that the wafer is brought into contact with the probe card together with the chuck top. Here, when the wafer is brought into contact with the probe card, the chuck top is mounted on a stage, and the stage moves the chuck top toward the probe card. Then, the chuck top is suctioned toward the probe card and is separated from the stage.

Recently, however, inspection conditions for inspecting a wafer have become complicated, and, in particular, many inspections are performed in a high temperature environment or a low temperature environment. In this case, it is required to adjust the temperature of the chuck top (the mounting table) to a temperature at which the inspection is performed. The temperature adjustment of the chuck top is performed based on a temperature measured by a temperature sensor which is used for temperature control and provided on the chuck top. The temperature sensor for temperature control is calibrated and corrected, for example, every month or every six months. For example, it is conceivable that calibration of the temperature sensor for temperature control is performed by disposing a paperweight type (a thermocouple type) temperature sensor for calibration on the chuck top and manually performing a measurement in a state open to the atmosphere. However, in the state open to the atmosphere, unlike the vacuum-suction state, heat escapes from the chuck top to the atmosphere, and, thus, a temperature distribution may differ from that of the vacuum-suction state. Further, it has been proposed to calibrate the temperature sensor for temperature control, for example, by using a calibration wafer provided with a temperature measurement resistor. However, when a resistance value of the temperature measurement resistor of the calibration wafer is measured, the measurement may be complicated due to, e.g., the need of taking a resistance value of a wiring into consideration. Therefore, a mounting table which can easily perform the calibration of the control temperature sensor in the vacuum-suction state is desired.

First Embodiment

[Configuration of Wafer Inspection Device 10]

Figure 1:
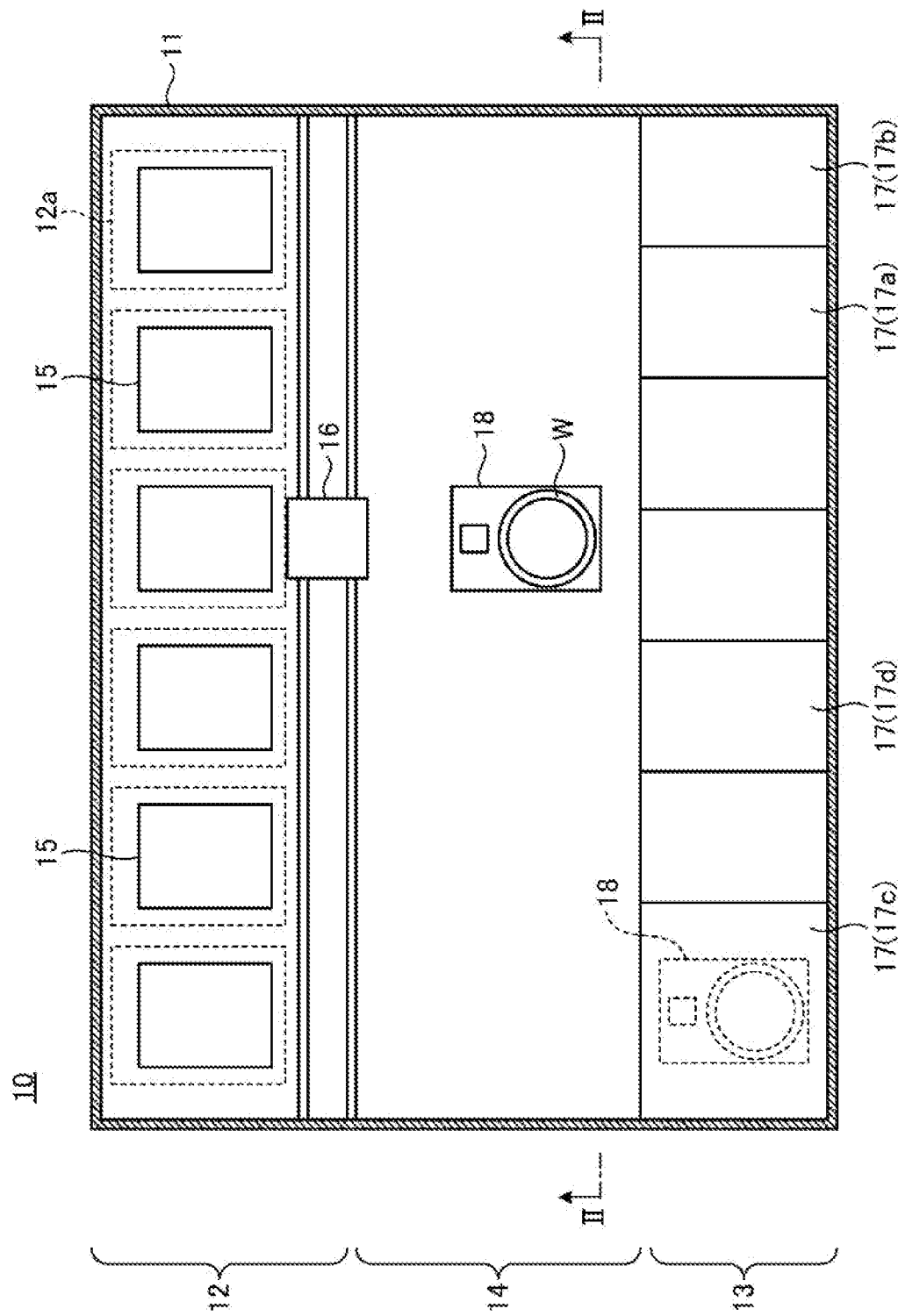
FIG. 1 is a diagram showing an example of a wafer inspection device according to a first embodiment of the present disclosure.
Figure 2:
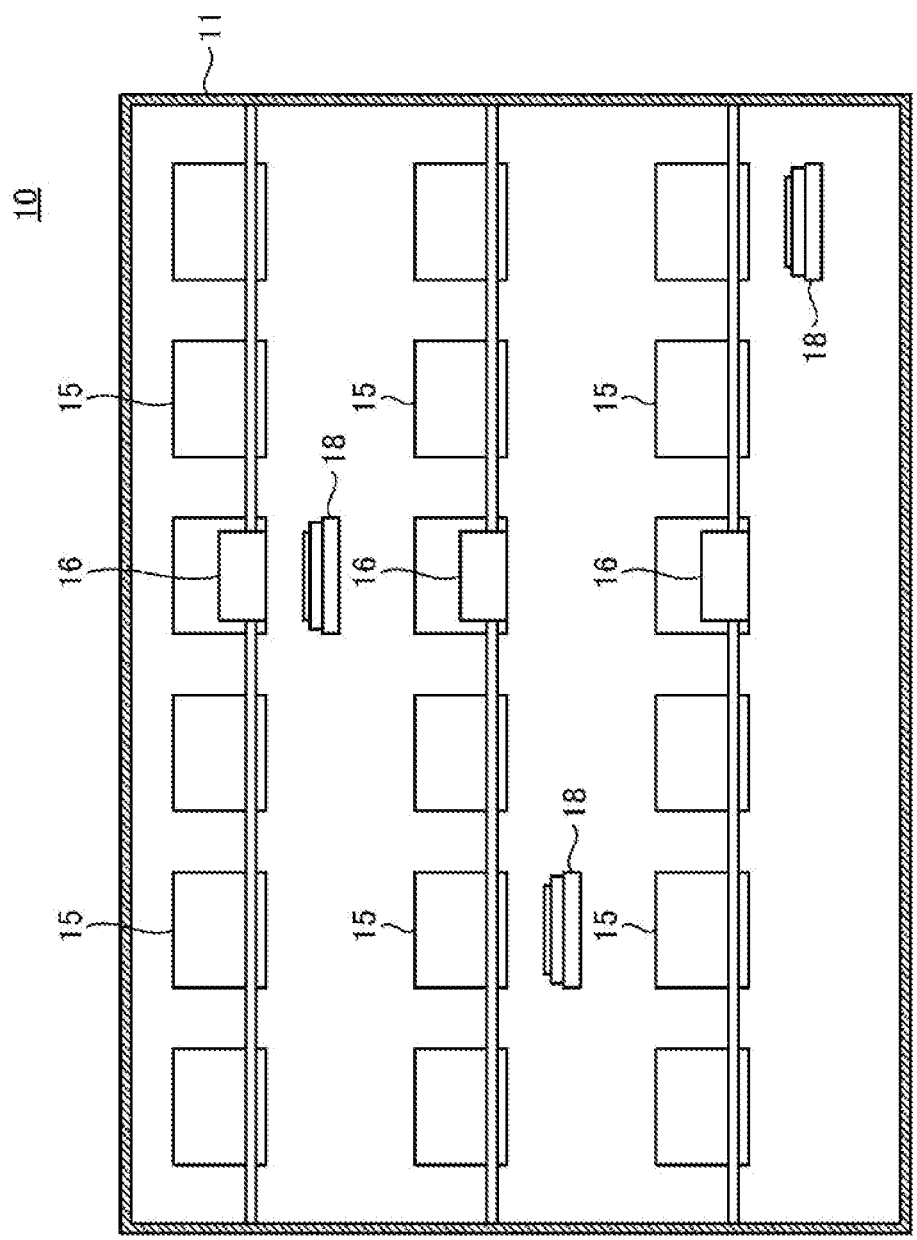
FIG. 2 is a cross-sectional view taken along line II-II in FIG. 1.

FIG. 1 is a diagram showing an example of a wafer inspection device according to a first embodiment of the present disclosure. Further, FIG. 2 is a cross-sectional view taken along line II-II in FIG. 1. The wafer inspection device 10 shown in FIGS. 1 and 2 includes an inspection chamber 11. The inspection chamber 11 includes an inspection region 12 in which an inspection of electrical characteristics of each of semiconductor devices of a wafer W is performed, and a loading and unloading region 13 in which the wafer W is loaded into and unloaded from the inspection chamber 11, and a transport region 14 provided between the inspection region 12 and the loading and unloading region 13.

A plurality of testers 15, as interfaces for wafer inspection, are disposed in the inspection region 12, and a plurality of inspection spaces 12a respectively corresponding to the testers 15 are provided. Specifically, the inspection region 12 has a three-layer structure of tester rows each consisting of the plurality of testers arranged horizontally, and one tester-side camera 16 is disposed corresponding to each of the tester rows. Each of the tester-side cameras 16 moves horizontally along the corresponding tester row so as to be located in front of each of the testers 15 in the tester row, to thereby check the position of the wafer W or the like which is transported by a transport stage 18 to be described later, and the degree of inclination of a chuck top 29 to be described later.

The loading and unloading region 13 is divided into a plurality of accommodation spaces 17. A port 17a, an aligner 17b, a loader 17c, and a controller 17d are disposed in each of the accommodation spaces 17. The port 17a accepts FOUP which is a container for accommodating a plurality of wafers. The aligner 17b aligns the position of the wafer. In the loader 17c, the probe card 19 which will be described later is loaded and unloaded. The controller 17d controls an operation of each of constituents of the wafer inspection device 10.

The transport stage 18 which can be moved not only to the transport region 14 but also to the inspection region 12 and the loading and unloading region 13 is disposed in the transport region 14. Transport stages 18 are provided such that each of them corresponds to each of the tester rows, receives the wafer W from the port 17a of the loading and unloading region 13, transports the wafer W to each of the inspection spaces 12a, and also transports the wafer W from each of the inspection spaces 12a to the port 17a when the inspection of the electrical characteristics of the semiconductor device has been completed.

In the wafer inspection device 10, each of the testers 15 performs the inspection of the electrical characteristics of each of the semiconductor devices of the transported wafer W. At this time, in the wafer inspection device 10, since the electrical characteristics of each of the semiconductor devices of one wafer W can be tested in one inspection space 12a while the transport stage 18 is transporting another wafer W toward another inspection space 12a, wafer inspection efficiency can be improved.

Figure 3:
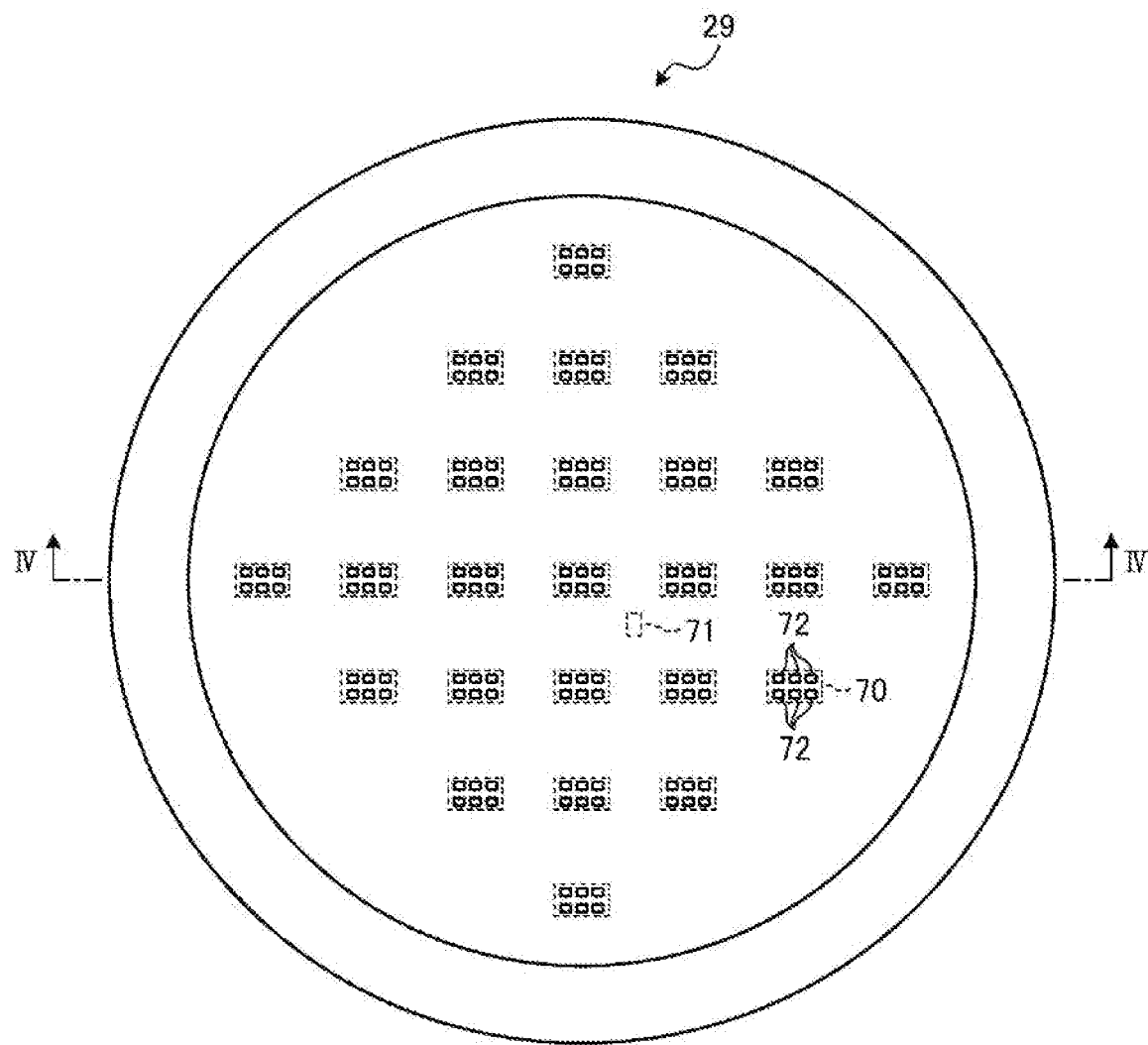
FIG. 3 is a diagram showing an example of a configuration of a chuck top according to the first embodiment of the present disclosure.
Figure 4:
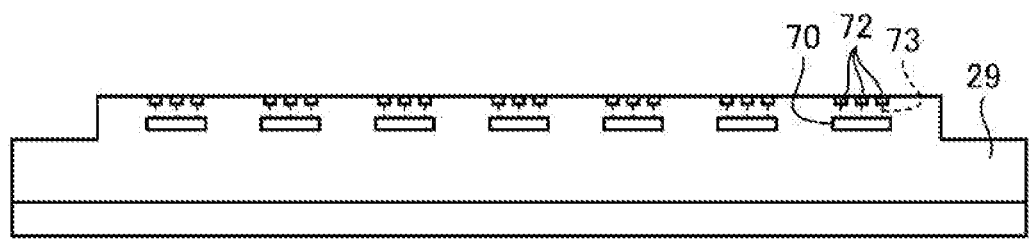
FIG. 4 is a cross-sectional view taken along line III-III in FIG. 3.

Here, the chuck top 29 which is the mounting table will be described with reference to FIGS. 3 and 4. FIG. 3 is a diagram showing an example of a configuration of the chuck top according to the first embodiment of the present disclosure. In addition, FIG. 4 is a cross-sectional view taken along line III-III in FIG. 3. As shown in FIGS. 3 and 4, the chuck top 29 includes a plurality of temperature sensors 70 and a control temperature sensor 71 therein on the mounting surface side. Further, the chuck top 29 has a plurality of electrode pads 72 in contact with contact probes 25 of the probe card 19, which will be described later, on a mounting surface thereof.

A plurality of temperature sensors 70 are provided, for example, on the mounting surface of the chuck top 29 such that each covers a region of a wafer ranging 200 mm to 300 mm. The number of temperature sensors 70 is 25 in the example of FIG. 3, but it may be less than 25 or more than or equal to 25 as long as a 2-dimensional temperature distribution of the mounting surface can be obtained. The number of temperature sensors 70 can be any number in a range of 17 to 1000, for example. As the temperature sensor 70, for example, a digital temperature sensor can be used. Impacts of wiring resistance and noise can be suppressed as much as possible by way of using the digital temperature sensor. The temperature sensor 70 has an accuracy of ±0.3° C. (the maximum value) in a range of −55° C. to +150° C., for example. The temperature sensor 70 has interfaces referred to as I$^2$C or SMBus, and outputs temperature data. In FIGS. 3 and 4, for the sake of explanation, the size of the temperature sensor 70 is shown larger than it actually is. The actual size of the temperature sensor 70 is, for example, 2 mm$^2$ and about 0.8 mm thick, or 1.5 mm×0.95 mm and about 0.5 mm thick.

The control temperature sensor 71 is a temperature sensor for controlling the temperature of the chuck top 29 when the wafer inspection device 10 inspects a wafer W to be inspected. The control temperature sensor 71 is, for example, a temperature sensor that uses a platinum temperature measurement resistor. The wafer inspection device 10 measures the resistance value of the control temperature sensor 71 and obtains the temperature by calculating the temperature of the chuck top 29 based on the measured resistance value.

The electrode pads 72 are electrode pad, each of which is used for power supply and communication for a corresponding one of the temperature sensors 70. An electrode pad 72 is electrically connected to a corresponding terminal of the temperature sensor 70 through a through hole 73. That is, the electrode pad 72 is a terminal of the temperature sensor 70 on the mounting surface, and a signal of the temperature (temperature data) measured by the temperature sensor 70 can be read by the tester 15 via the probe card 19.

Figure 5:
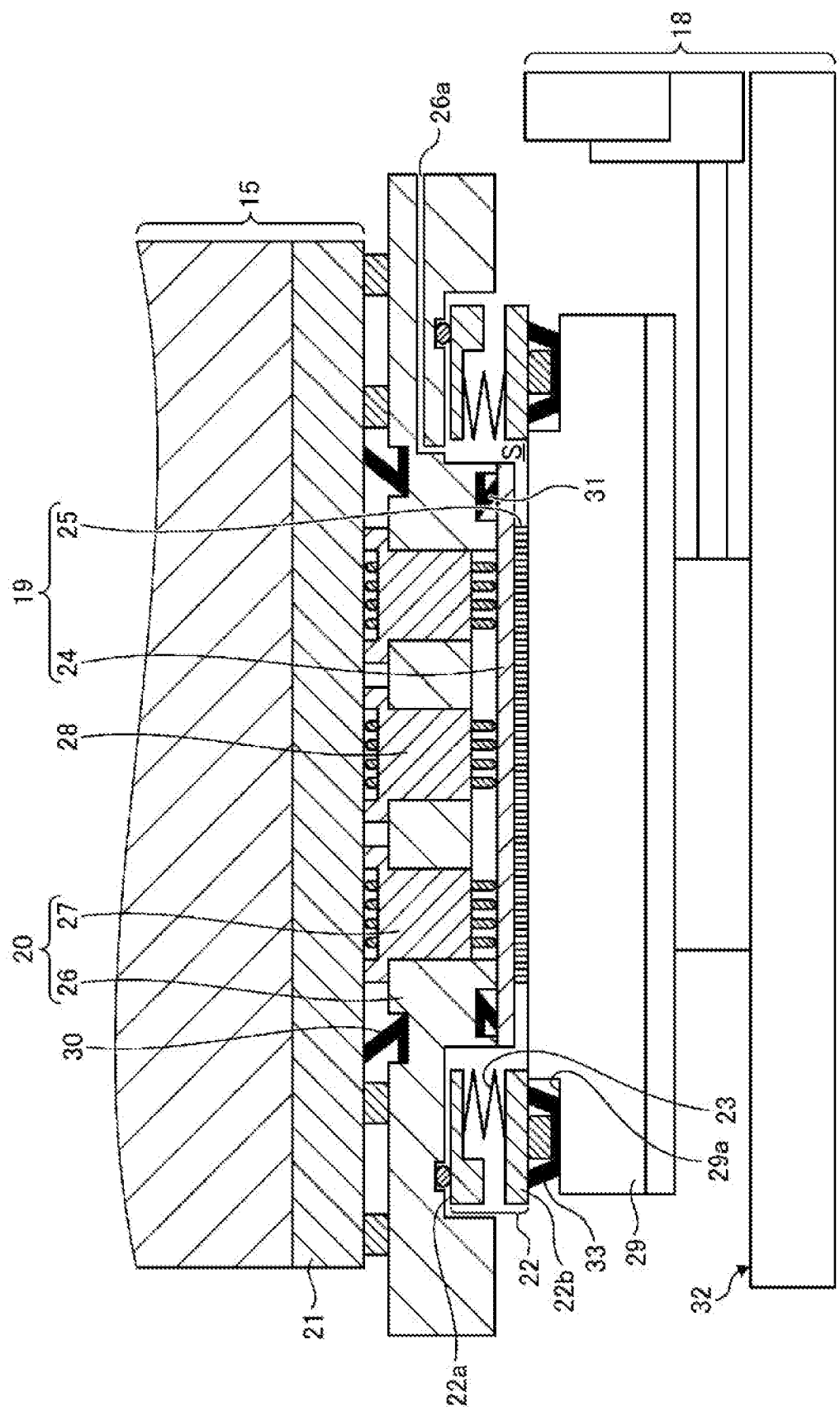
FIG. 5 is a diagram showing an example of a configuration of a transport stage and a tester according to the first embodiment.

Next, the configuration of the transport stage and the tester will be described with reference to FIGS. 5 and 6. FIG. 5 is a diagram showing an example of the configuration of the transport stage and the tester according to the first embodiment. That is, FIG. 5 shows a state in which the transport stage 18 brings the chuck top 29 into contact with the probe card 19 of the tester 15 and mainly shows the configuration of the inspection space 12a in a cross-sectional view. In the description of FIG. 5, a state in which the wafer W is not mounted will be described.

In FIG. 5, the tester 15 is installed on a pogo frame 20 fixed to a device frame (not shown). The probe card 19 is installed on a lower portion of the pogo frame 20. A flange 22 is disposed to surround the probe card 19.

The probe card 19 includes a disk-shaped main body 24, a plurality of electrodes (not shown) disposed on almost the entire upper surface of the main body 24, and a plurality of contact probes 25 (contact terminals) disposed so as to protrude downward in the drawing from the lower surface of the main body 24. Each of the electrodes is connected to each of the corresponding contact probes 25. Each of the contact probes 25 comes into contact with each of the electrode pads 72 formed on the mounting surface of the chuck top 29 when the probe card 19 has come into contact with the chuck top 29. When the wafer W is mounted on the chuck top 29, each of the contact probes 25 comes into contact with each of the electrode pads or the solder bumps of each of the semiconductor devices formed on the wafer W.

The pogo frame 20 has a substantially flat plate-shaped main body 26 and pogo block insertion holes 27 which are a plurality of through holes formed in the vicinity of the central portion of the main body 26, and a pogo block 28, which is formed by arranging a plurality of pogo pins, is inserted into each of the pogo block insertion holes 27. The pogo block 28 is connected to an inspection circuit (not shown) included in the tester 15 and is in contact with the plurality of electrodes on the upper surface of the main body 24 of the probe card 19 installed on the pogo frame 20. The pogo block 28 is electrically connected to each of the contact probes 25 of the probe card 19 connected to the electrodes and sends signals of the temperature data output from the plurality of temperature sensors 70 toward the inspection circuit via each of the contact probes 25. When the wafer W is mounted on the chuck top 29, the pogo block 28 sends an electric signal to each of the contact probes 25 of the probe card 19 and also sends an electric signal sent from the electric circuit of each of the semiconductor devices of the wafer W through each of the contact probes 25 toward the inspection circuit.

The flange 22 includes an upper flange 22a and a lower flange 22b. Further, the flange 22 has a cylindrical bellows 23 between the upper flange 22a and the lower flange 22b. The upper flange 22a is engaged with the pogo frame 20 and is sealed by means of packing or the like. The lower flange 22b is movable in a vertical direction with respect to the pogo frame 20.

The lower flange 22b moves downwards due to its own weight so that the lower surface of the lower flange 22b is located below the tip end of each of the contact probes 25 of the probe card 19 until the chuck top 29 comes into contact with the lower flange 22b. The bellows 23 is a metal bellows structure which can expand and contract in the vertical direction. The lower end and the upper end of the bellows 23 are in tight contact with the upper surface of the lower flange 22b and the lower surface of the upper flange 22a, respectively.

A space between the pogo frame 20 and a base 21 of the tester 15 is sealed with a sealing material 30, and the base 21 is installed on the pogo frame 20 due to the space being vacuum-suctioned. A space between the pogo frame 20 and the probe card 19 is also sealed by a sealing member 31, and the probe card 19 is installed on the pogo frame 20 by the vacuum-suctioning of the space.

The transport stage 18 has a chuck top 29 made of a thick place member and an aligner 32. The chuck top 29 is mounted on the aligner 32, and the wafer W is mounted on the upper surface of the chuck top 29 at the time of inspection. The chuck top 29 is vacuum-suctioned to the aligner 32, and the wafer W is vacuum-suctioned to the chuck top 29. Therefore, when the transport stage 18 moves, it is possible to prevent the wafer W from moving relative to the transport stage 18. A holding method of the chuck top 29 and the wafer W is not limited to vacuum suction, and any method, e.g., holding by electromagnetic adsorption or a clamp, will be fine as long as the chuck top 29 and the wafer W are prevented from moving relative to the aligner 32. A step 29a is formed on the peripheral edge portion of the upper surface of the chuck top 29, and a sealing member 33 is disposed on the step 29a.

Since the transport stage 18 is movable, the transport stage 18 can be moved to below the probe card 19 in the inspection space 12a to cause the wafer W mounted on the chuck top 29 to face the probe card 19 and also to move the wafer W toward the tester 15. When the temperature of the chuck top 29 is calibrated, the transport stage 18 allows the chuck top 29, on which the wafer W is not mounted, to face the probe card 19. A space S is a space formed when the chuck top 29 comes into contact with the lower flange 22b and when the chuck top 29 or the wafer W comes into contact with the probe card 19. That is, the space S is a space surrounded by the chuck top 29, the flange 22, the pogo frame 20, and the probe card 19, and is sealed by the bellows 23 and the sealing member 33. In the space S, the chuck top 29 is held on the probe card 19 side by the vacuum-suctioning of the space S through a vacuum line 26a. In the space S, the chuck top 29 or the wafer W mounted on the chuck top 29 comes into contact with the probe card 19. At this time, the electrode pads 72 of the chuck top 29 and the contact probes 25 of the probe card 19 come into contact with each other. Alternatively, each of the electrode pads or each of the solder bumps on each of the semiconductor devices of the wafer W comes into contact with each of the contact probes 25 of the probe card 19. In the wafer inspection device 10, the movement of the transport stage 18 is controlled by the controller 17d, and the controller 17d obtains the position and the amount of movement of the transport stage 18.

The aligner 32 adjusts the relative position and slope of the chuck top 29 with respect to the probe card 19. In the wafer inspection device 10, a temperature control mechanism, such as a heater or a refrigerant passage (none of which is shown), is built in the chuck top 29 in each of the inspection spaces 12a, and the inspection in a high temperature environment or a low temperature environment is realized. Therefore, in the inspection in the high temperature or low temperature environment, the aligner 32 adjusts the position and slope according to deformation of the probe card 19 or chuck top 29 due to heat dissipation from the heater built in the chuck top 29 or heat absorption into the refrigerant passage. For example, the temperature range may range 130° C. to −40° C.

Figure 6:
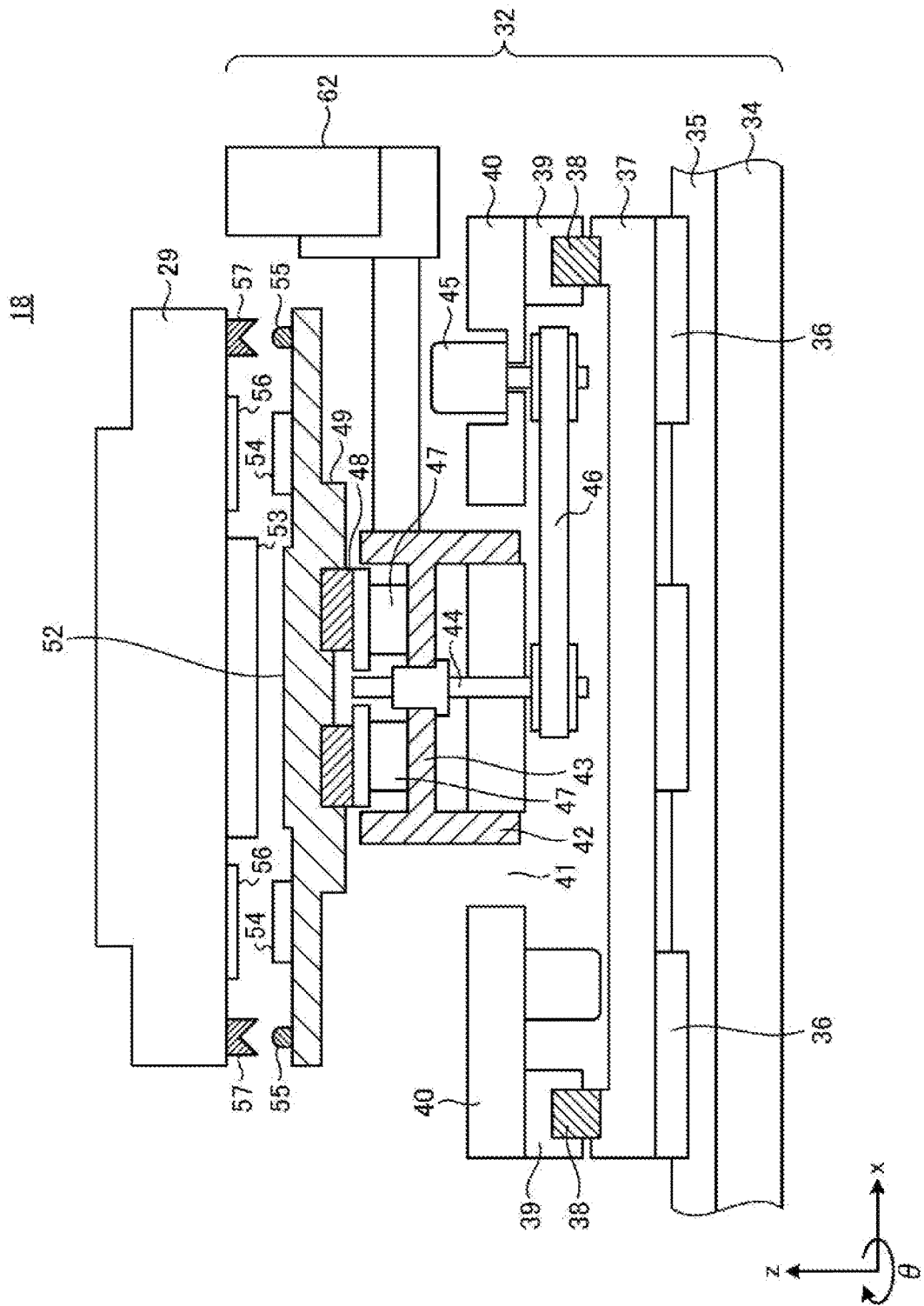
FIG. 6 is a diagram showing a detailed example of the configuration of the transport stage.

FIG. 6 is a diagram showing a detailed example of the configuration of the transport stage. FIG. 6 sees through the inside of the aligner 32 to facilitate understanding. In addition, the chuck top 29 is drawn to be separated from the aligner 32. In the drawing, the left-right direction is X direction, the vertical direction is Z direction, the depth direction is Y direction, and the rotation direction around an axis in the Z direction is θ direction.

As shown in FIG. 6, the aligner 32 has an X base 34 made of a plate-shaped member, an X guide 35, X blocks 36, a Y base 37, a Y guide 38, Y blocks 39, and a Z base 40. The X guide 35 is a rail-shaped guide which extends in the X direction on the X base 34. The X blocks 36 are a plurality of blocks which can be moved in the X direction by engaging with the X guide 35. The Y base 37 is a plate-shaped member supported by each of the X blocks 36. The Y guide 38 is a rail-shaped guide which extends in the Y direction on the Y base 37. The Y blocks 39 are a plurality of blocks which can be moved in the Y direction by engaging with the Y guide 38. The Z base 40 is a plate-shaped member supported by each of the Y blocks 39. The Y base 37 can move in the X direction with respect to the X base 34 by the movement of each of the X blocks 36 in the X direction. In addition, the Z base 40 can move in the Y direction with respect to the Y base 37 and the X base 34 by the movement of each of the Y blocks 39 in the Y direction.

Further, a Z block hole 41 is formed in the center of the Z base 40, and a Z block 42 having an H-shaped cross section is loosely fitted into the Z block hole 41. The Z block 42 has a flange-shaped portion 43 therein, and the flange-shaped portion 43 is screwed with a ball screw 44 which extends in the Z direction. The ball screw 44 rotates around the axis by a rotational force transmitted from a Z-axis motor 45 via a driving belt 46, and the flange-shaped portion 43 screwed with the rotating ball screw 44 moves in the Z direction. As a result, the Z block 42 moves in the Z direction along a guide (not shown). A plurality of actuators are disposed on the upper surface of the flange-shaped portion 43, and each of the actuators 47 supports a substantially disk-shaped chuck base 49 via a roller ring 48. The roller ring 48 has a driving mechanism in the θ direction (not shown) and supports the chuck base 49 so as to be rotatable in the θ direction. The number of actuators 47 to be disposed may be two or more and, for example, three actuators 47 may be disposed, or two actuators 47 and one fixed height support part (not shown) may be disposed. The chuck base 49 rotates in the θ direction by means of a structure (not shown). The chuck base 49 has a chuck top suction surface 52 which is the central portion of the upper surface, and a bottom plate 53 of the chuck top 29 is vacuum-suctioned to the chuck top suction surface 52. As a result, the chuck top 29 is installed and mounted on the aligner 32. Further, the chuck base 49 includes a plurality of height sensors 54 disposed on a peripheral edge portion of the upper surface, and a positioning pin 55 having a hemispherical upper end. On the other hand, the chuck top 29 includes a plurality of detection plates 56 disposed at positions on the lower surface facing each of the height sensors 54, and a plurality of positioning blocks 57 disposed at positions facing each of the positioning pins 55.

When the chuck top 29 is mounted on the aligner 32, each of the height sensors 54 measures a distance from the upper surface of the chuck base 49 to the lower surface of the chuck top 29 which is a relative positional relationship between the chuck top 29 and the chuck base 49 (the aligner 32). Specifically, the height sensor 54 measures a distance from each of the height sensors 54 to each of the corresponding detection plates 56 (hereinafter, referred to as a "chuck top height"). Each of the measured chuck top heights is stored in a memory of the controller 17d, or the like. The chuck top height is measured for each of the height sensors 54. Here, when the chuck top 29 is mounted on the aligner 32, the chuck top 29 and the chuck base 49 may not always be completely parallel with respect to each other due to certain factors such as the slope of the chuck top suction surface 52. That is, since the chuck top 29 may be slightly tilted with respect to the chuck base 49, for example, a chuck top height measured by one height sensor 54 is 500 μm while a chuck top height measured by another height sensor 54 may be 550 μm. In the wafer inspection device 10, the chuck top heights measured by the respective height sensors 54 are stored in association with the respective height sensors 54.

The lower end of each of the positioning blocks 57 is formed in a cone shape and engages with the hemispherical upper end of the corresponding positioning pin 55. In the wafer inspection device 10, the position of the chuck top 29 with respect to the chuck base 49 (the aligner 32) is defined by engaging each of the positioning blocks 57 with a corresponding one of the corresponding positioning pins 55.

Further, the aligner 32 has an upward confirmation camera 62 for confirming the degree of slope of the probe card 19 and the pogo frame 20. The upward confirmation camera 62 is installed on the Z block 42. Further, in the aligner 32, each of the actuators 47 lifts the chuck base 49, such that the lift amount by each of the actuators 47 can be adjusted individually. That is, the aligner 32 can adjust the slope of the chuck base 49 and also the slope of the chuck top 29 by making the lift amounts by the respective actuators 47 different from one another.

[Temperature Calibration Method]

Figure 7:
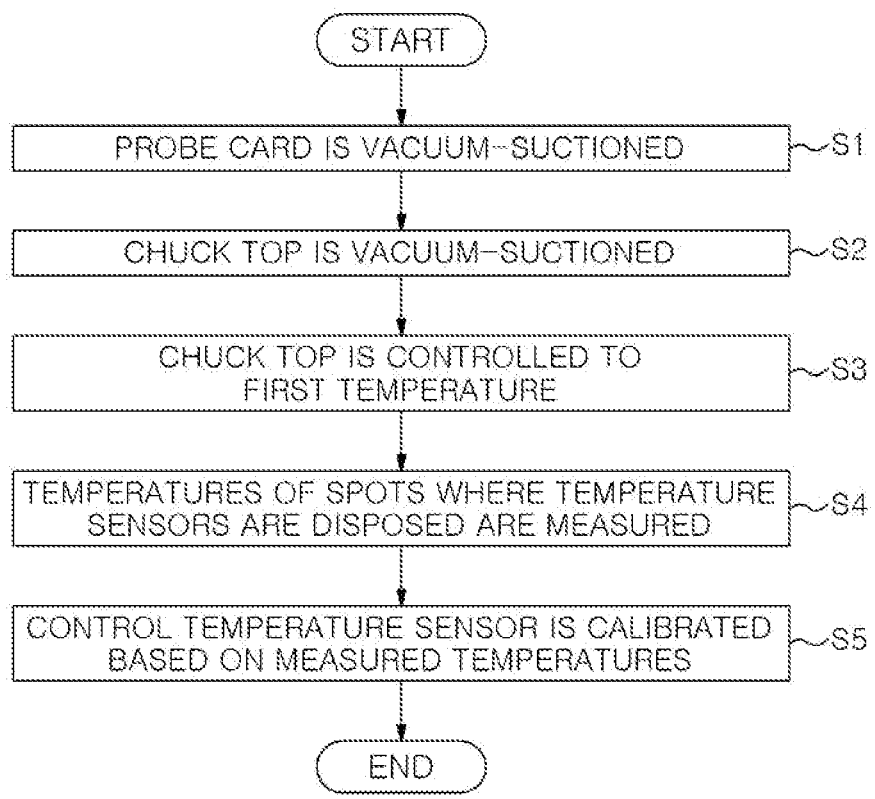
FIG. 7 is a flowchart showing an example of a temperature calibration method according to the first embodiment.

Next, a temperature calibration method according to the first embodiment will be described. FIG. 7 is a flowchart showing an example of the temperature calibration method according to the first embodiment.

The wafer inspection device 10 transports the probe card 19 from the loader 17c to the inspection space 12a, in which temperature calibration is performed, by using the transport stage 18. The wafer inspection device 10 has the probe card 19 vacuum-suctioned from the transport stage 18 to the pogo frame 20 (Step S1).

Next, the wafer inspection device 10 transports the chuck top 29 to the inspection space 12a, in which temperature calibration is performed, by using the transport stage 18. The wafer inspection device 10 transports the chuck top 29 to a position below the probe card 19 by means of the transport stage 18. The wafer inspection device 10 raises the chuck top 29 and brings the electrode pads 72 of the chuck top 29 into contact with the contact probes 25 of the probe card 19. Further, the wafer inspection device 10 causes the chuck top 29 to be vacuum-suctioned to the probe card 19 side (Step S2).

The wafer inspection device 10 retracts the transport stage 18 from the inspection space 12a, controls a temperature control mechanism (a chiller) of the chuck top 29 (not shown), and controls the chuck top 29 to a first temperature which serves as a reference for temperature calibration (Step S3). When the first temperature is −40° C., the wafer inspection device 10 controls, for example, a refrigerant of −45° C. and the heater in the chuck top 29 to thereby maintain the temperature to −40° C.

The tester 15 acquires the temperature data measured at the spots where the temperature sensors 70 are disposed on the chuck top 29 (Step S4). The tester 15 calculates an offset amount for the control temperature sensor 71 based on the acquired temperature data. That is, the tester 15 measures a correlation between a surface temperature of the chuck top 29 and the control temperature sensor 71. For example, when the set temperature of the chuck top 29 in the wafer inspection device 10 is the first temperature, the tester 15 calculates, as the offset amount, the difference between the average value of the temperature distribution of the mounting surface based on the temperatures measured by the temperature sensors 70 and the first temperature. The tester 15 calibrates the control temperature sensor 71 based on the calculated offset amount (Step S5). When the temperature calibration is completed, the wafer inspection device 10 proceeds to the inspection of the wafer W to be inspected.

As described above, in the first embodiment, the control temperature sensor of the mounting table can be easily calibrated in the vacuum-suction state. Further, in the first embodiment, in the multi-head wafer inspection device 10, the control temperature sensor of the mounting table can be calibrated without stopping the other head (the tester 15). That is, in the first embodiment, a downtime of the wafer inspection device 10 can be shortened. Further, in the first embodiment, since the temperature calibration can be performed by normal alignment, it is not necessary to wait for a dew point recovery when the cover of the inspection chamber 11 is opened for installing a jig on the chuck top 29.

Second Embodiment

In the first embodiment, the control temperature sensor 71 of the chuck top 29 was calibrated using the tester 15 of the wafer inspection device 10, but the control temperature sensor 71 may be calibrated using a test jig instead of the tester 15. Similarly to the tester 15, the jig calculates, for example, the offset amount of the control temperature sensor 71 based on the temperature data measured by the temperature sensors 70. The jig calibrates the control temperature sensor 71 based on the calculated offset amount. This jig is connected to the pogo frame 20 or the like so that electric signals can be transmitted and received via the contact probe 25 without exposing the inspection space 12a to the external atmosphere in which the wafer inspection device 10 is installed. As described above, in the second embodiment, the calibration of the control temperature sensor of the mounting table can be easily performed in the vacuum-suction state without using the tester 15. That is, in the second embodiment, for example, the inspection and maintenance of the tester 15 and the calibration of the control temperature sensor 71 of the chuck top 29 can be performed at the same time.

As described above, according to the first embodiment, the mounting table (the chuck top 29) is a mounting table on which a substrate to be inspected (the wafer W) is mounted, and has a plurality of temperature sensors 70 and electrode pads 72. Each of the plurality of temperature sensors 70 measures the temperature at a corresponding one of a plurality of spots on the mounting table. Each of the electrode pads is connected to a corresponding one of the temperature sensors 70 and installed on the mounting surface. As a result, the calibration of the control temperature sensor of the mounting table can be easily performed in the vacuum-suction state.

Further, according to the first embodiment, the temperature sensors 70 are disposed inside the mounting table (the chuck top 29) and electrically connected to the electrode pads 72. As a result, the temperature data of each of portions of the mounting table can be acquired via the probe card 19.

Further, according to the first embodiment, the electrode pads 72 are installed so as to be able to come into contact with the probes of the probe card 19. In addition, signals of the temperatures measured by the temperature sensors 70 can be read via the probe card 19. As a result, the calibration of the control temperature sensor of the mounting table can be easily performed in the vacuum-suction state.

Further, according to the first embodiment, the mounting table (the chuck top 29) further includes a control temperature sensor 71 used for controlling the temperature of the mounting table. The control temperature sensor 71 is calibrated based on the temperatures respectively measured by the plurality of temperature sensors 70. As a result, the downtime of the wafer inspection device 10 can be shortened.

Further, according to the first embodiment, the mounting table (chuck top 29) is vacuum-suctioned to the pogo frame 20 which supports the probe card 19. In addition, the measurement by the plurality of temperature sensors 70 is performed in a state in which the space between the mounting table and the probe card 19 is vacuum-suctioned. As a result, the calibration of the control temperature sensor of the mounting table can be easily performed in the vacuum-suction state.

Further, according to the first embodiment, the inspection device (the wafer inspection device 10) is an inspection device which inspects the substrate to be inspected (the wafer W) and has the mounting table (the chuck top 29) on which the substrate to be inspected is mounted. The mounting table includes the plurality of temperature sensors and the electrode pads 72. Each of the plurality of temperature sensors 70 measures the temperature at each of the plurality of spots on the mounting table. Each of the electrode pads 72 is connected to a corresponding one of the temperature sensors 70 and installed on the mounting surface. As a result, the calibration of the control temperature sensor of the mounting table can be easily performed in the vacuum-suction state.

Further, according to the first embodiment, in the temperature calibration method of the mounting table (the chuck top 29) on which the substrate to be inspected is mounted, the mounting table is vacuum-adsorbed to the probe card 19 side where the probe which comes into contact with the mounting table is formed. In addition, the temperature calibration method measures the temperatures at the plurality of spots using the plurality of temperature sensors 70 which are installed on the mounting table and measure the temperatures at the plurality of spots on the mounting table. In the temperature calibration method, the control temperature sensor 71 which controls the temperature of the mounting table is calibrated based on the measured temperatures at the plurality of spots. As a result, the calibration of the control temperature sensor of the mounting table can be easily performed in the vacuum-suction state.

Each of the embodiments disclosed at this time should be considered as exemplary in all respects, and it should be considered as being not restrictive. Each of the above embodiments may be omitted, replaced, or modified in various forms without departing from the scope of the appended claims and the gist thereof.

DESCRIPTION OF REFERENCE NUMERALS

10: wafer inspection device
15: tester
18: transport stage
19: probe card
20: pogo frame
25: contact probes
29: chuck top
32: aligner
70: temperature sensors
71: control temperature sensor
72: electrode pads
73: through hole
W: wafer

The invention claimed is:
1. A mounting table on which a substrate to be inspected is mounted, comprising:
   a plurality of temperature sensors, each configured to measure a temperature of a corresponding one of a plurality of spots on the mounting table;
   electrode pads, each connected to a corresponding one of the plurality of temperature sensors and installed on a mounting surface, and
   a control temperature sensor used for controlling the temperature of the mounting table, wherein the electrode pads are installed so as to be contacted with probes of a probe card, signals of temperatures measured by the plurality of temperature sensors are readable through the probe card, the control temperature sensor is calibrated based on the temperatures respectively measured by the plurality of temperature sensors, and the plurality of temperature sensors are disposed inside the mounting table, respectively positioned below their corresponding electrode pads, and electrically connected to the corresponding electrode pads through through-holes formed between the temperature sensors and the corresponding electrode pads.

2. The mounting table of claim 1, wherein the mounting table is vacuum-suctioned to a pogo frame which supports the probe card, and the measurement by the plurality of temperature sensors is performed in a state in which a space between the mounting table and the probe card is vacuum-suctioned.

3. An inspection device for inspecting a substrate to be inspected, comprising:

a mounting table on which the substrate to be inspected is mounted, wherein the mounting table includes a plurality of temperature sensors, each configured to measure a temperature of a corresponding one of a plurality of spots on the mounting table, electrode pads, each connected to a corresponding one of the plurality of temperature sensors and installed on a mounting surface, and a control temperature sensor used for controlling the temperature of the mounting table, the electrode pads are installed so as to be contacted with probes of a probe card, signals of temperatures measured by the plurality of temperature sensors are readable through the probe card, the control temperature sensor is calibrated based on the temperatures respectively measured by the plurality of temperature sensors, and the plurality of temperature sensors are disposed inside the mounting table, respectively positioned below their corresponding electrode pads, and electrically connected to the corresponding electrode pads through through-holes formed between the temperature sensors and the corresponding electrode pads.

4. A temperature calibration method for a mounting table on which a substrate to be inspected is mounted, comprising:

vacuum-suctioning the mounting table to a probe card side on which probes to be contacted with the mounting table are formed;

measuring temperatures of a plurality of spots by using a plurality of temperature sensors which are provided on the mounting table and respectively measure the temperatures at a plurality of spots of the mounting table;

reading signals of the temperatures respectively measured by the plurality of temperature sensors through electrode pads, each connected to a corresponding one of the plurality of temperature sensors and installed on a mounting surface so as to be contacted with probes of a probe card, and through the probe card; and calibrating a control temperature sensor used for controlling the temperature of the mounting table based on the measured temperatures at the plurality of spots, wherein the plurality of temperature sensors are disposed inside the mounting table, respectively positioned below their corresponding electrode pads, and electrically connected to the corresponding electrode pads through through-holes formed between the temperature sensors and the corresponding electrode pads.

* * * * *